United States Patent [19]

Kimber

[11] 4,232,848

[45] Nov. 11, 1980

[54] DRILL BOOM ARRANGEMENT

[75] Inventor: Erich V. Kimber, Handen, Sweden

[73] Assignee: Atlas Copco Aktiebolag, Nacka, Sweden

[21] Appl. No.: 28,892

[22] Filed: Apr. 10, 1979

[30] Foreign Application Priority Data

Apr. 11, 1978 [SE] Sweden ............................... 7804052

[51] Int. Cl.³ .............................................. F16M 1/00
[52] U.S. Cl. ....................................... 248/652; 173/43
[58] Field of Search ............. 248/654, 666, 647, 651, 248/652, 653; 173/38, 43, 42, 28, ; 182/2; 414/687, 694

[56] References Cited

U.S. PATENT DOCUMENTS

| 3,020,012 | 2/1962 | Moracco et al. | 248/654 |
|---|---|---|---|
| 3,226,064 | 12/1965 | Thompson | 248/654 |
| 3,523,336 | 8/1970 | Kimber | 248/654 |
| 3,664,436 | 5/1972 | Beagan | 173/28 X |
| 3,711,047 | 1/1973 | O'Leary | 248/654 |
| 3,782,484 | 1/1974 | Martin | 248/652 X |
| 3,923,276 | 12/1975 | Kimber | 248/654 |
| 3,973,747 | 8/1976 | Jagerstrom | 248/654 X |
| 3,982,715 | 9/1976 | Lindgren | 248/654 |
| 4,022,410 | 5/1977 | Ewart | 248/652 X |

*Primary Examiner*—J. Franklin Foss
*Attorney, Agent, or Firm*—Frishauf, Holtz, Goodman and Woodward

[57] ABSTRACT

In a drill boom arrangement, a feed beam for a rock drill is turnable by means of a hydraulic turning device (34) about an axis (45) that is normally parallel with the axis of drilling during drifting. When not actuated, the turning device (34) is at least partially relieved of torque by means of a friction coupling (52) which is coupled in parallel with the turning device and is normally engaged. The coupling is automatically released when the turning device is actuated. A slip-coupling (67) is coupled in parallel with the first coupling (52) and in series with the turning device in order to avoid overloading of the turning device which is hydraulically self-braking.

18 Claims, 5 Drawing Figures

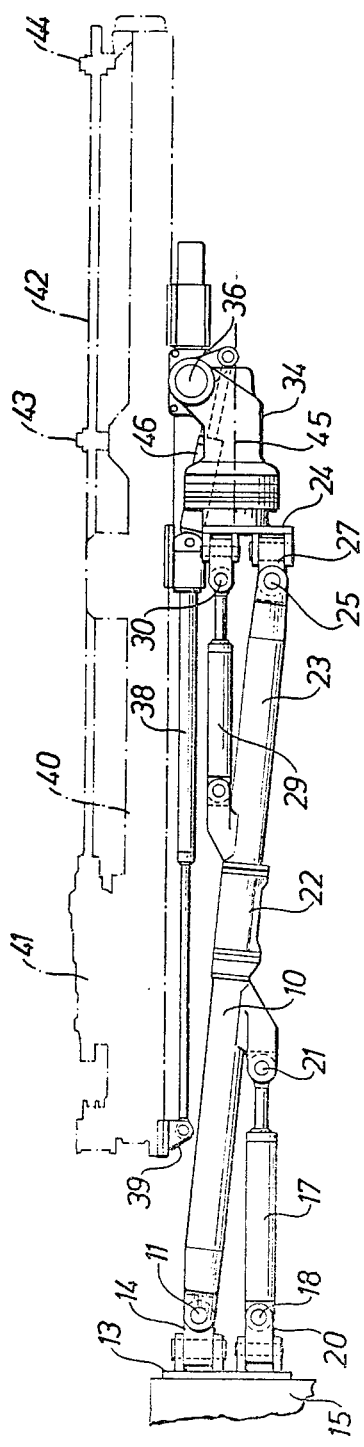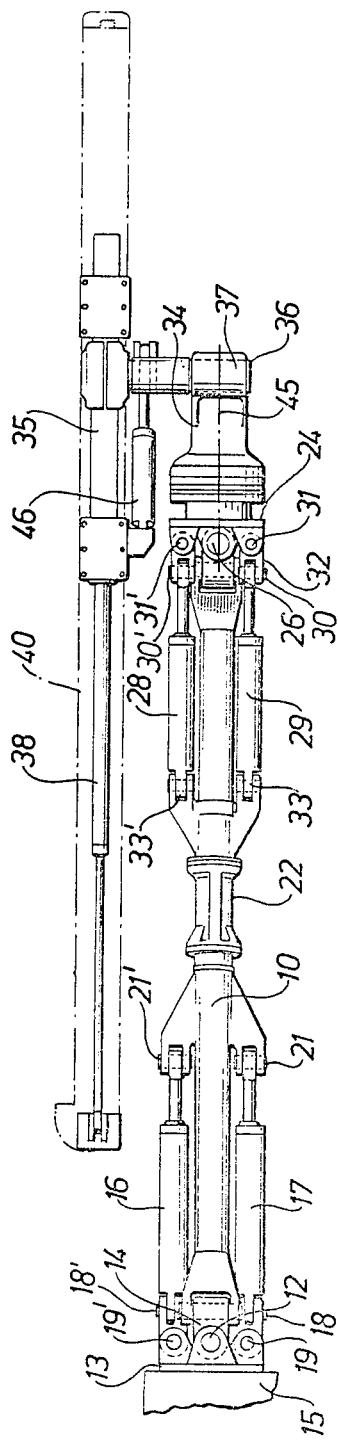

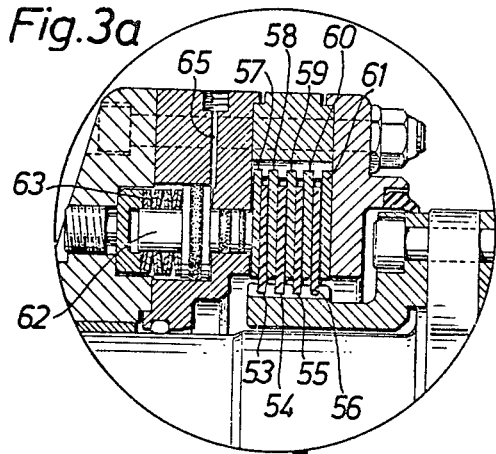
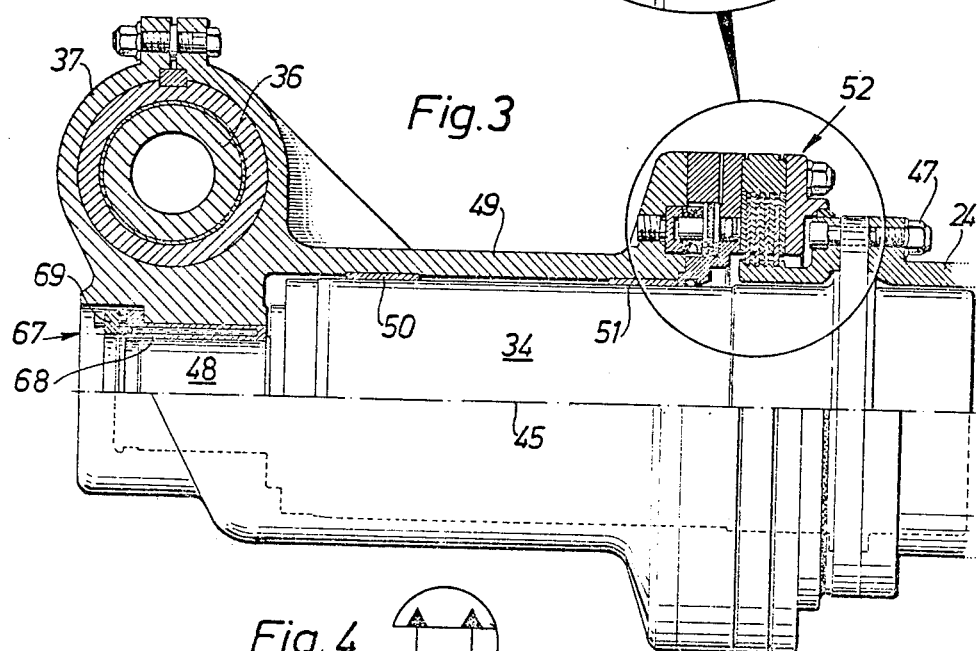
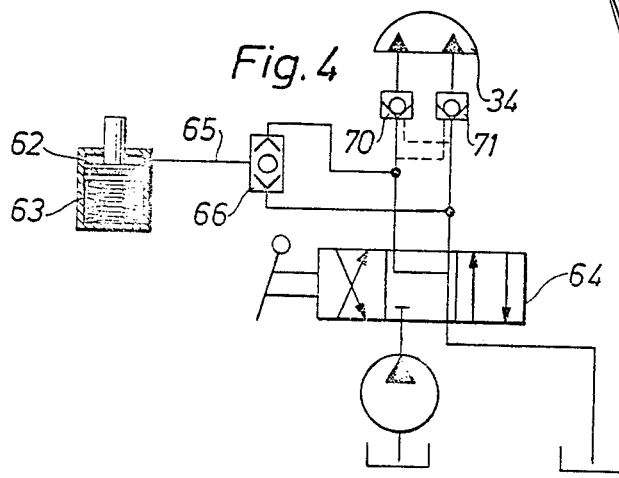

DRILL BOOM ARRANGEMENT

BACKGROUND OF THE INVENTION

This invention relates generally to drill booms and more particularly to a drill boom arrangement for positioning an elongated rock drilling apparatus to different drilling positions with respect to a boom support wherein the drill boom is pivotally connected to the boom support, a boom head carrying the elongated rock drilling apparatus is pivotally connected to the drill boom, and the rock drilling apparatus is rotatable about a geometrical polar axis which is parallel with the longitudinal direction of the rock drilling apparatus.

During drilling, a turning moment arises about the polar axis. In previously known drill booms of this type the turning moment is transferred to the drill boom through the turning device which rotates the rock drilling apparatus about the polar axis. The turning moment can be considerable, particularly in drill boom arrangements where the rock drilling apparatus is pivotable to a position which is substantially perpendicular to the polar axis.

It is an object of the invention to provide a drill boom of the above type in which the turning device does not need to be dimensioned to be able to transfer the whole turning moment. This means that the turning device can be smaller and less expensive. Another object of the invention is to provide a drill boom in which the turning moment is divided into two components; one component which is transferred to the drill boom through the turning device and one component which is transferred directly to the drill boom.

The above and other purposes of the invention will become obvious from the following description and from the accompanying drawings in which one embodiment of the invention is illustrated by way of example. It should be understood that this embodiment is only illustrative of the invention and that various modifications thereof may be made within the scope of the claims following hereinafter.

BRIEF DESCRIPTION OF THE DRAWINGS

FIG. 1 shows a side view of a drill boom in which the invention is applied.

FIG. 2 is a top view of the drill boom in FIG. 1.

FIG. 3 shows partly in section a coupling means according to the invention.

FIG. 3a shows a portion of the coupling means on an enlarged scale.

FIG. 4 shows a hydraulic circuit for controlling the turning device and the coupling means.

DETAILED DESCRIPTION

In FIGS. 1, 2 a drill boom 10 is pivotally supported on a horizontal cross shaft 11 and a vertical cross shaft 12 which are carried by a boom support or bracket 13. The horizontal cross shaft 11 is journalled in a link 14 which is swingable together with the drill boom 10 about the vertical cross shaft 12. The boom support 13 is carried by an element 15 which forms part of a drill wagon or rig, not shown, on which several drill booms 10 can be mounted in a group.

The drill boom is swingable about the cross shafts 11, 12 by means of hydraulic lift and swing cylinders 16, 17. The cylinder 17 is pivotable about a horizontal cross shaft 18 and a vertical cross shaft 19 which are carried by the boom support 13. The horizontal cross shaft 18 is journalled in a link 20 which is swingable together with the cylinder 17 about the vertical cross shaft 19. The end of the piston rod of the cylinder 17 is pivotally connected to the drill boom 10 by means of a joint 21 that takes up vertical movement and some horizontal movement. The cylinder 16 is connected to the boom support 13 and the drill boom 10 in the same manner as the cylinder 17. The cross shafts associated with the cylinder 16 are designated with $18^1$, $19^1$, $21^1$. The cylinders 16, 17 are of equal size and have the same mounting geometry relative to the boom support 13 and the drill boom 10.

Due to the fact that the boom support 13 carries the cylinder 17 for swinging about the vertical shaft 19 which is laterally spaced from the vertical swinging plane of the drill boom 10 a variation in length of solely the cylinder 17 will cause the drill boom 10 to swing about both the vertical shaft 12 and the horizontal shaft 11.

An extension or contraction of the cylinders 16, 17 of equal amount causes the drill boom 10 to swing only about the horizontal cross shaft 11. An extension of the cylinder 17 and a contraction of the cylinder 16 of equal amount or vice versa causes the drill boom 10 to swing about only the vertical cross shaft 12. By differently varying the lengths of the cylinders 16, 17 the drill boom 10 will simultaneously swing about both cross shafts 11, 12.

At its distal end the drill boom 10 carries a guide housing 22 in which a boom extension member 23 is guided axially slidably but non-rotatably. The boom extension member 23 is longitudinally adjustable by means of a hydraulic cylinder which is mounted inside the drill boom in a conventional manner. The guide housing 22 and the boom extension member 23 are described in detail in U.S. Pat. No. 3,923,276. The joint 21 is located at a predetermined distance from the cross shaft 12. This distance, thus, is maintained constant during swinging of the drill boom 10.

The boom extension member 23 carries a boom head 24. The boom head 24 is pivotally supported by the boom extension member on a horizontal shaft 25 and a vertical shaft 26. The horizontal shaft 25 is journalled in a link 27 which is swingable together with the boom extension member about the vertical shaft 26.

The boom head 24 is swingable about the cross shafts 25, 26 by means of hydraulic tilt and swing cylinders 28, 29. The end of the piston rod of the cylinder 29 is swingable about a horizontal cross shaft 30 and a vertical cross shaft 31 which are carried by the boom head 24. The horizontal cross shaft 30 is journalled in a link 32 which is swingable together with the cylinder 29 about the vertical cross shaft 31. The cylinder 29 is pivotally connected to the boom extension member 23 by means of a joint 33, that takes up vertical movement and some horizontal movement. The cylinder 28 is connected to the boom head 24 and the boom extension member 23 in the same manner as the cylinder 29. The cross shafts associated with the cylinder 28 are designated with $30^1$, $31^1$, $33^1$. The cylinders 28, 29 are of equal size and have the same mounting geometry relative to the boom head 24 and the boom extension member 23.

Due to the fact that the vertical swinging axis of the cylinder 29 is laterally spaced from the vertical swinging plane of the boom head 24 a variation in length of solely the cylinder 29 will cause the boom head 24 to swing about both the vertical shaft 26 and the horizontal shaft 25.

An extension or contraction of the cylinders 28, 29 of equal amount causes the boom head 24 to swing only about the horizontal cross shaft 25. An extension of the cylinder 29 and a contraction of the cylinder 28 of equal amount or vice versa causes the boom head 24 to swing only about the vertical cross shaft 26. By differently varying the lengths of the cylinders 28, 29 the boom head 24 will simultaneously swing about both cross shafts 25, 26.

The boom head 24 carries a turning device 34 which can be of the type disclosed in U.S. Pat. No. 3,563,321 incorporated by means of reference herein. Since the construction of the turning device is not essential to the invention it is not described in detail.

A feed beam holder 35 is pivotally journalled in a casing 37 by means of a cross shaft 36. The casing 37 is coupled to the propeller shaft of the turning device 34. The feed beam holder 35 carries an elongated rock drilling apparatus which includes a feed beam 40 which supports a rock drill 41. The feed beam includes hydraulic power means for displacing the drill along the feed beam in a conventional manner. The rock drill 41 rotates a drill steel 42 and delivers impacts on the drill steel. The drill steel 42 is guided by means of drill steel centralizers 43, 44. A hydraulic feed beam extension cylinder 38 for axially displacing the feed beam 40 is fixed to the feed beam holder 35 and it is also fixed to a bracket 39 which in its turn is fixed in the feed beam 40. The feed beam 40 is slidably supported in the longitudinal direction thereof on the feed holder 35 by means of guides fixed thereon. By extension or contraction of the feed beam extension cylinder 38 the feed beam 40 can be adjusted longitudinally with respect to the drill boom 10.

In order to obtain a hydraulically bound parallel displacement of the feed beam 40 during swinging of the drill boom 10 the cylinder 16 is connected to the cylinder 29 and the cylinder 17 is connected to the cylinder 28. This hydraulic parallel displacement arrangement is described in detail in Swedish Pat. No. 7804051-6. This patent teaches that the requirements which must be met in order to obtain an exact parallel displacement of the feed beam 40 during swinging of the drill boom 10 are that a triangle having its corners on the horizontal swinging axes 11, 18, 21 is similar to a triangle having its corners on the horizontal swinging axes respectively 25, 30$^1$, 33$^1$ and that a triangle having its corners on the vertical swinging axes 12, 19, 21 is similar to a triangle having its corners on the vertical axes 26, 31$^1$, 33$^1$.

The turning device 34 is fixedly connected to the boom head 24 by means of bolts 47. By actuating the turning device 34 the feed beam 40 can be rotated 360° about an axis 45. A sleeve member 49 is fixedly connected to the casing 37 perpendicular thereto. The sleeve member 49 is journalled on the housing of the turning device 34 by means of bearings 50, 51.

According to the invention the sleeve member 49 and thus also the feed beam 40 can be locked relative to the boom head 24 against rotation about the axis 45 by means of a coupling generally denoted by 52. The coupling 52 is mounted on the turning device 34 concentrically therewith. The coupling 52 is of a friction clutch type known per se and comprises friction discs 53–56 which are non-rotatably connected to the boom head 24 and friction discs 57–61 which are nonrotatably connected to the sleeve member 49. An actuating means comprising peripherally spaced pistons 62 is adapted to apply a pressure force on the friction discs 53–61 by means of springs 63, e.g. Belleville springs. The spring force is of sufficient magnitude to lock the feed beam 40 against rotation about the axis 45. The pistons 62 are mounted in the sleeve member 49. Upon actuation of the turning device 34 by means of a control valve 64, hydraulic fluid is supplied through a conduit 65 to act upon the surface of the piston 62 which is opposite to the springs 63. The coupling 52 is thus released. Due to a shuttle valve 66 the coupling 52 is released independently of the direction of rotation of the turning device 34.

By means of a cylinder 46 the feed beam 40 can be swung about the cross shaft 36 substantially 90° to a position which is at right angle to the axis 45. During drilling with the feed beam in this position, the turning moment which arises and has to be transferred to the boom head 24 and the drill boom 10 is considerable. Because of the coupling means 52 this turning moment can wholly or preferably partly be transferred directly to the boom head 24. This means that the turning device 34 has to be dimensioned to be able to actively rotate the feed beam about the polar axis 45. It need not be dimensioned to withstand the moments that will occur during drilling.

According to the invention the drill boom is also provided with a second coupling of a friction clutch type known per se, generally denoted by 67. This slipcoupling 67 is adapted to lock the feed beam 40 relative to the propeller shaft 48 of the turning device 34. The coupling means 67 comprises a sleeve 68 provided with an inner recess which is fluid-filled. The fluid pressure and thus the maximum transferable moment between the shaft 48 and the feed beam 40 can be adjusted by means of an axially movable cover 69 so that the turning device 34 cannot be overloaded. The turning device 34 is preferably self-braking by means of a so called hydraulic lock that comprises two pilot-operated check valves 70, 71 in the two supply lines of the turning device.

The two couplings 52, 67 are connected between the feed beam 40 and the boom head 24 in parallel with each other. This means that the total lock moment which prevents rotation of the feed beam 40 about the axis 45 is the sum of the lock moments of the couplings 52, 67. Preferably, the magnitudes of the two lock moments are in the same order. Due to the fact that the couplings 52, 67 are of friction clutch type, the transferred moment is automatically distributed on the two coupling means 52, 67.

The coupling means 52, 67 are preferably dimensioned starting from the deformation moment of the turning device 34. By means of the cover 69 the coupling means 67 is set to a transferable moment which is below this deformation moment to a suitable certainty. The coupling means 52, then, has to be dimensioned to be able to transfer the difference between the allowed overall lock moment and the moment which is transferred by the coupling means 67. The deformation moment of the turning device 34 is usually more than twice the maximum active torque of the turning device.

I claim:
1. A drill boom arrangement comprising:
   a boom support (13),
   a boom (10) pivotably carried by said boom support, a boom head (24) which carries an elongated rock drilling apparatus (40,41) and is itself pivotably carried by said boom, a power operated turning device (34) for turning said elongated rock drilling apparatus relative to said boom head about an axis (45) which is substantially parallel with a vertical swinging plane of said elongated rock drilling apparatus, a bias engageable power operated coupling means (52) which is coupled in parallel with said turning device (34) between the boom head (24) and the rock drilling apparatus (40,41) for locking said elongated rock drilling apparatus relative to said boom head against rotation about said axis (45), and control means (62,66) coupled to said coupling means (52) and arranged to automatically release said coupling means (52) upon actuation of said turning device (34).

2. A drill boom arrangement according to claim 1 in which said turning device (34) is hydraulically powered through a supply line, spring means (63) is provided and arranged to bias said coupling means (52) engaged, and said control means comprises hydraulically actuated piston means (62) to counteract and overcome said spring means (63), said piston means being connected to said supply line.

3. A drill boom arrangement according to claim 2 in which said turning device (34) is hydraulically operated and hydraulically self-braking.

4. A drill boom arrangement according to claim 1 in which said coupling means comprises a first friction coupling (52), said turning device (34) is self-braking, and further comprising a slip-coupling (67) arranged operatively in series with the self-braking turning device (34) and in parallel with said first coupling (52), so that the locking torques of said first friction coupling (52) and said slip-coupling (67) are added.

5. A drill boom arrangement according to claim 4 in which the slip torque of the slip-coupling (67) is substantially higher than the maximum active output torque of the turning device (34).

6. A drill boom arrangement according to claim 5 in which the slip torques of the first friction coupling (52) and of the slip-coupling (67) are of the same order of magnitude.

7. A drill boom arrangement according to claim 5 or 6 in which said first friction coupling (52) comprises a plurality of friction discs (53–56, 57–61).

8. A drill boom arrangement according to claim 1 in which the turning device (34) is fixedly connected to the boom head (24).

9. A drill boom arrangement according to claim 8 in which said turning device (34) includes a housing, and further comprising a sleeve member (49) which carries the elongated rock drilling apparatus, said sleeve member being journalled on the housing of said turning device (34).

10. A drill boom arrangement according to claim 7 wherein said bias engageable power operated coupling means (52) comprises spring means (63) arranged to apply a pressure force on said friction dics.

11. A drill boom arrangement comprising:
a boom support (13),
a boom (10) pivotably carried by said boom support,
a boom head (24) which carries an elongated rock drilling apparatus (40,41) and is itself pivotably carried by said boom,
a power operated self-braking turning device (34) for turning said elongated rock drilling apparatus relative to said boom head about an axis (45) which is substantially parallel with a vertical swinging plane of said elongated rock drilling apparatus,
a power operated coupling means (52) which is coupled in parallel with said turning device (34) between the boom head (24) and the rock drilling apparatus (40,41) said coupling means comprising a first friction coupling (52) for locking said elongated rock drilling apparatus relative to said boom head against rotation about said axis (45), and
a slip-coupling (67) arranged operatively in series with said self-braking turning device (34) and in parallel with said first friction coupling (52), so that the locking torques of said first friction coupling (52) and said slip coupling (67) are added.

12. A drill boom arrangement according to claim 11 in which said turning device (34) is hydraulically operated and hydraulically self-braking.

13. A drill boom arrangement according to claim 11 in which the slip torque of the slip-coupling (67) is substantially higher than the maximum active output torque of the turning device (34).

14. A drill boom arrangement according to claim 13 in which the slip torques of the first friction coupling (52) and of the slip-coupling (67) are of the said order of magnitude.

15. A drill boom arrangement according to claim 13 or 14 in which said first friction coupling (52) comprises a plurality of friction discs (53–56, 57–61).

16. A drill boom arrangement according to claim 15 in which said power operated coupling means comprises spring means (63) arranged to apply a pressure force on said plurality of friction discs.

17. A drill boom arrangement according to claim 11 in which the turning device (34) is fixedly connected to the boom head (24).

18. A drill boom arrangement according to claim 17 in which said turning device (34) includes a housing, and further comprising a sleeve member (49) which carries the elongated rock drilling apparatus, said sleeve member being journalled on the housing of said turning device (34).

* * * * *